(12) United States Patent
Yang et al.

(10) Patent No.: US 10,743,048 B2
(45) Date of Patent: Aug. 11, 2020

(54) SYSTEMS AND METHODS FOR CONTROLLING PURCHASING AND/OR REAUTHORIZATION TO ACCESS CONTENT USING QUICK RESPONSE CODES AND TEXT MESSAGES

(71) Applicant: The DIRECTV Group, Inc., El Segundo, CA (US)

(72) Inventors: Christopher Yang, Temple City, CA (US); Woei-Shyang Yee, Irvine, CA (US); Wesley Huie, Riverside, CA (US); Gerard V. Talatinian, Foothill Ranch, CA (US); Johnny Shum, Manhattan Beach, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 0 days.

(21) Appl. No.: 16/275,935

(22) Filed: Feb. 14, 2019

(65) Prior Publication Data

US 2019/0182522 A1 Jun. 13, 2019

Related U.S. Application Data

(60) Division of application No. 15/421,059, filed on Jan. 31, 2017, now Pat. No. 10,298,981, which is a
(Continued)

(51) Int. Cl.
*H04N 7/16* (2011.01)
*H04N 21/258* (2011.01)
(Continued)

(52) U.S. Cl.
CPC ..... *H04N 21/25816* (2013.01); *G06K 7/1095* (2013.01); *G06K 7/1417* (2013.01); *G06K 19/14* (2013.01); *H04N 21/2223* (2013.01); *H04N 21/2396* (2013.01); *H04N 21/2541* (2013.01); *H04N 21/2543* (2013.01); *H04N 21/25866* (2013.01); *H04N 21/25875* (2013.01);
(Continued)

(58) Field of Classification Search
None
See application file for complete search history.

(56) References Cited

U.S. PATENT DOCUMENTS 5,319,454 A * 6/1994 Schutte ..... H04N 7/10
348/E7.049
5,721,829 A * 2/1998 Dunn ..... H04N 7/17318
348/E5.097
(Continued)

*Primary Examiner* — William J Kim
(74) *Attorney, Agent, or Firm* — Harness, Dickey & Pierce, P.L.C.

(57) ABSTRACT

A mobile device including a content module, an imaging module, and an interface. The content module is configured to attempt to access content including transmitting a content request signal from the mobile device to a user receiving device. The imaging module is configured to acquire an image of at least a portion of a screen shown on a display connected to the user receiving device. The interface is configured to transmit the image or information pertaining to the image to the user receiving device, a head end or a content provider to cause the user receiving device or the mobile device to receive an authorization signal for access to the content.

20 Claims, 8 Drawing Sheets

Related U.S. Application Data continuation of application No. 14/587,930, filed on Dec. 31, 2014, now Pat. No. 9,693,083.

(51) Int. Cl.
| | | |
|---|---|---|
| *H04N 21/239* | (2011.01) | |
| *H04N 21/254* | (2011.01) | |
| *H04N 21/4627* | (2011.01) | |
| *H04N 21/41* | (2011.01) | |
| *H04N 21/414* | (2011.01) | |
| *H04N 21/4143* | (2011.01) | |
| *H04N 21/4223* | (2011.01) | |
| *H04N 21/4722* | (2011.01) | |
| *H04N 21/488* | (2011.01) | |
| *H04N 21/4623* | (2011.01) | |
| *H04N 21/6334* | (2011.01) | |
| *H04N 21/658* | (2011.01) | |
| *G06K 7/10* | (2006.01) | |
| *G06K 7/14* | (2006.01) | |
| *G06K 19/14* | (2006.01) | |
| *H04N 21/222* | (2011.01) | |
| *H04N 21/2543* | (2011.01) | |
| *H04N 21/475* | (2011.01) | |

(52) U.S. Cl.
CPC ..... *H04N 21/4126* (2013.01); *H04N 21/4143* (2013.01); *H04N 21/41407* (2013.01); *H04N 21/4223* (2013.01); *H04N 21/4623* (2013.01); *H04N 21/4627* (2013.01); *H04N 21/475* (2013.01); *H04N 21/4722* (2013.01); *H04N 21/4882* (2013.01); *H04N 21/6334* (2013.01); *H04N 21/6581* (2013.01)

(56) References Cited

U.S. PATENT DOCUMENTS

| | | |
|---|---|---|
| 6,097,441 A | 8/2000 | Allport |
| 2002/0049037 A1 | 4/2002 | Christensen et al. |
| 2002/0178446 A1* | 11/2002 | Sie .................... H04N 5/44543 725/32 |
| 2003/0237093 A1 | 12/2003 | Marsh |
| 2007/0124775 A1 | 5/2007 | DaCosta |
| 2007/0175978 A1 | 8/2007 | Stambaugh |
| 2007/0186241 A1 | 8/2007 | Sugimoto et al. |
| 2007/0217436 A1 | 9/2007 | Markley et al. |
| 2008/0071770 A1 | 3/2008 | Schloter et al. |
| 2008/0092154 A1* | 4/2008 | Hogyoku ............... H04N 7/163 725/1 |
| 2008/0201749 A1 | 8/2008 | Liu et al. |
| 2008/0243696 A1 | 10/2008 | LeVine |
| 2010/0100725 A1 | 4/2010 | Ozzie et al. |
| 2010/0311399 A1 | 12/2010 | Cusick et al. |
| 2011/0113441 A1 | 5/2011 | Jeong et al. |
| 2011/0247042 A1 | 10/2011 | Mallinson |
| 2011/0289537 A1 | 11/2011 | Buehl |
| 2012/0023167 A1* | 1/2012 | Hovdal ................ G06K 7/1095 709/204 |
| 2012/0042343 A1 | 2/2012 | Laligand et al. |
| 2012/0084822 A1 | 4/2012 | Durkee et al. |
| 2012/0150598 A1* | 6/2012 | Griggs ............... G06Q 30/0214 705/14.16 |
| 2012/0150750 A1 | 6/2012 | Law et al. |
| 2012/0151525 A1 | 6/2012 | Demchenko et al. |
| 2012/0153015 A1* | 6/2012 | Gomez ............ H04N 21/47214 235/375 |
| 2012/0198572 A1 | 8/2012 | Beals et al. |
| 2012/0222055 A1* | 8/2012 | Schaefer ............... G06Q 20/145 725/5 |
| 2013/0166452 A1* | 6/2013 | Song ..................... G06Q 20/40 705/44 |
| 2013/0273882 A1 | 10/2013 | Walsh et al. |
| 2014/0074855 A1 | 3/2014 | Zhao et al. |
| 2014/0259190 A1 | 9/2014 | Kiang et al. |
| 2014/0279469 A1 | 9/2014 | Mendes |
| 2015/0087357 A1 | 3/2015 | Jung et al. |
| 2015/0100983 A1 | 4/2015 | Pan |
| 2015/0142537 A1 | 5/2015 | Sears |

* cited by examiner

SYSTEMS AND METHODS FOR CONTROLLING PURCHASING AND/OR REAUTHORIZATION TO ACCESS CONTENT USING QUICK RESPONSE CODES AND TEXT MESSAGES

CROSS-REFERENCE TO RELATED APPLICATIONS

This application is a divisional of U.S. application Ser. No. 15/421,059 filed on Jan. 31, 2017 and claims benefit to U.S. application Ser. No. 14/587,930 which was filed on Dec. 31, 2014. The entire disclosure of the above application is incorporated herein by reference herein.

TECHNICAL FIELD

The present disclosure relates generally to television systems and, more specifically, to systems and methods for controlling purchasing and reauthorization to access content.

BACKGROUND

The statements in this section merely provide background information related to the present disclosure and may not constitute prior art.

Satellite television has become increasingly popular due to a wide variety of content and the quality of content available. A satellite television system typically includes a set top box that is used to receive satellite signals and decode the satellite signals for use on a television. The set top box typically has a memory associated therewith. The memory may include a digital video recorder or the like as well as storage for an operating code of the set top box.

Content providers provide a variety of content to consumers. Available content is typically received at a set top box (or user receiving device) and displayed to the user using a guide. The guide typically includes channels and timeslots as well as programming information for each information timeslot. The programming information may include the content title and other identifiers such as actor information and the like. The user selects a channel via the guide and the set top box (STB) then displays the channel on a display (e.g., a television).

Customers (or users) of a service provider can subscribe to various packages. Each of the packages provides access to a certain set of channels. The customers call the service provider to establish an account with the service provider. While setting up an account, a customer selects a package and provides billing information to the service provider. The customer is then able to access channels in the selected package.

In addition to the channels in a selected package that a customer is signed up to receive, the customer may also receive additional content. This may include the customer selecting a channel, program and/or video via the STB and/or again calling the service provider to request for the selected channel, program and/or video. For example, a customer may request a video, obtain authorization to receive the video, and receive the video at a STB of the customer. This is often referred to as pay-per-view (PPV). The video is transmitted to the STB and may then be displayed on a display (or television) of the STB. The customer may control when the video is displayed.

In certain instances, authorization to content that a user (or subscriber) has subscribed to can be lost. For example, if a STB is power OFF for an extended period of time, authorization to certain content may be lost. Authorization codes are sent from a content provider to the STB. The STB periodically receives reauthorization codes to maintain access to certain content. If the STB is OFF when the reauthorization codes are sent, the STB does not receive the reauthorization codes and thus loses authorization to access the content. As another example, an authorization (or reauthorization) code may not be received properly and/or may not be processed properly thereby preventing access to the content.

SUMMARY

The present disclosure provides systems and methods for providing content access based on quick response codes and text messages.

In one aspect of the disclosure, a mobile device is provided and includes a content module, an imaging module, and an interface. The content module is configured to attempt to access content including transmitting a content request signal from the mobile device to a user receiving device. The imaging module is configured to acquire an image of at least a portion of a screen shown on a display connected to the user receiving device. The interface is configured to transmit the image or information pertaining to the image to the user receiving device, a head end or a content provider to cause the user receiving device or the mobile device to receive an authorization signal for access to the content.

In another aspect of the disclosure, a mobile device is provided and includes a content module, a control module, and an interface. The content module is configured to attempt to access content including transmitting a content request signal from the mobile device to a user receiving device. The control module is configured receive a text message or an image of the text message, where the text message was displayed on a display connected to a user receiving device prior to the control module receiving the text message or the image of the text message, and where the text message is based on the content request signal. The interface is configured to transmit the text message to a head end or a content provider to cause the user receiving device or the mobile device to receive an authorization signal for access to the content.

In another aspect of the disclosure, a user receiving device is provided and includes an interface and a control module. The interface is configured to receive a content request signal from a mobile device to access content. The control module is configured to, in response to the content request signal, display a content preview screen on a display, where the content preview screen includes a message and at least one of a quick response code, a text message and a user input element. The interface is configured to, based on the at least one of the quick response code, the text message and a user input corresponding to the user input element, receive a second request signal to access the content from the mobile device. The control module is configured to obtain an authorization code based on the second request signal and download or display the content based on the authorization code.

In another aspect of the disclosure, a head end is provided and includes an interface and an authentication code. The interface is configured to receive a request for content, where the request for content includes at least one of an image, quick response code information, and a text message from a user receiving device or a mobile device. The authentication module is configured to, based on the at least one of the image, the quick response code information, and the text message, generate an authorization signal for the content. The interface is configured to transmit the authorization signal from the head end to the user receiving device or the mobile device to permit downloading of the content by the user receiving device or the mobile device.

In another aspect of the disclosure, a content provider is provided and includes an interface and an authentication module. The interface is configured to receive a request for content, where the request for content includes at least one of an image, quick response code information, and a text message from a user receiving device or a mobile device. The authentication module is configured to, based on the at least one of the image, the quick response code information, and the text message generate an authorization signal for the content. The interface is configured to transmit the authorization signal from the content provider to the user receiving device or the mobile device to permit downloading of the content by the user receiving device or the mobile device.

In another aspect of the disclosure, a method of operating a mobile device is provided. The method includes: attempting to access content including transmitting a content request signal from the mobile device to a user receiving device; acquiring an image of at least a portion of a screen shown on a display connected to the user receiving device; and transmitting the image or information pertaining to the image to the user receiving device, a head end or a content provider to cause the user receiving device or the mobile device to receive an authorization signal for access to the content.

In another aspect of the disclosure, a method of operating a mobile device is provided. The method includes: attempting to access content including transmitting a content request signal from the mobile device to a user receiving device; receiving at the mobile device a text message or an image of the text message, wherein the text message was displayed on a display connected to a user receiving device prior to the mobile device receiving the text message or the image of the text message, and wherein the text message is based on the content request signal; and transmitting the text message to a head end or a content provider to cause the user receiving device or the mobile device to receive an authorization signal for access to the content.

In another aspect of the disclosure, a method is provided and includes: receiving at the user receiving device a content request signal from a mobile device to access content; in response to the content request signal, displaying a content preview screen on a display, wherein the content preview screen includes a message and at least one of a quick response code, a text message and a user input element; based on the at least one of the quick response code, the text message and a user input corresponding to the user input element, receiving a second request signal to access the content from the mobile device; and obtaining an authorization code based on the second request signal and download or display the content based on the authorization code.

In another aspect of the disclosure, a method of operating a head end is provided. The method includes: receiving at the head end to receive a request for content, wherein the request for content includes at least one of an image, quick response code information, and a text message from a user receiving device or a mobile device; based on the at least one of the image, the quick response code information, and the text message, generating an authorization signal for the content; and transmitting the authorization signal from the head end to the user receiving device or the mobile device to permit downloading of the content by the user receiving device or the mobile device.

In another aspect of the disclosure, a method of operating a content provider is provided. The method includes: receiving at the content provider to receive a request for content, wherein the request for content includes at least one of an image, quick response code information, and a text message from a user receiving device or a mobile device; based on the at least one of the image, the quick response code information, and the text message, generating an authorization signal for the content; and transmitting the authorization signal from the content provider to the user receiving device or the mobile device to permit downloading of the content by the user receiving device or the mobile device.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

Figure 6:
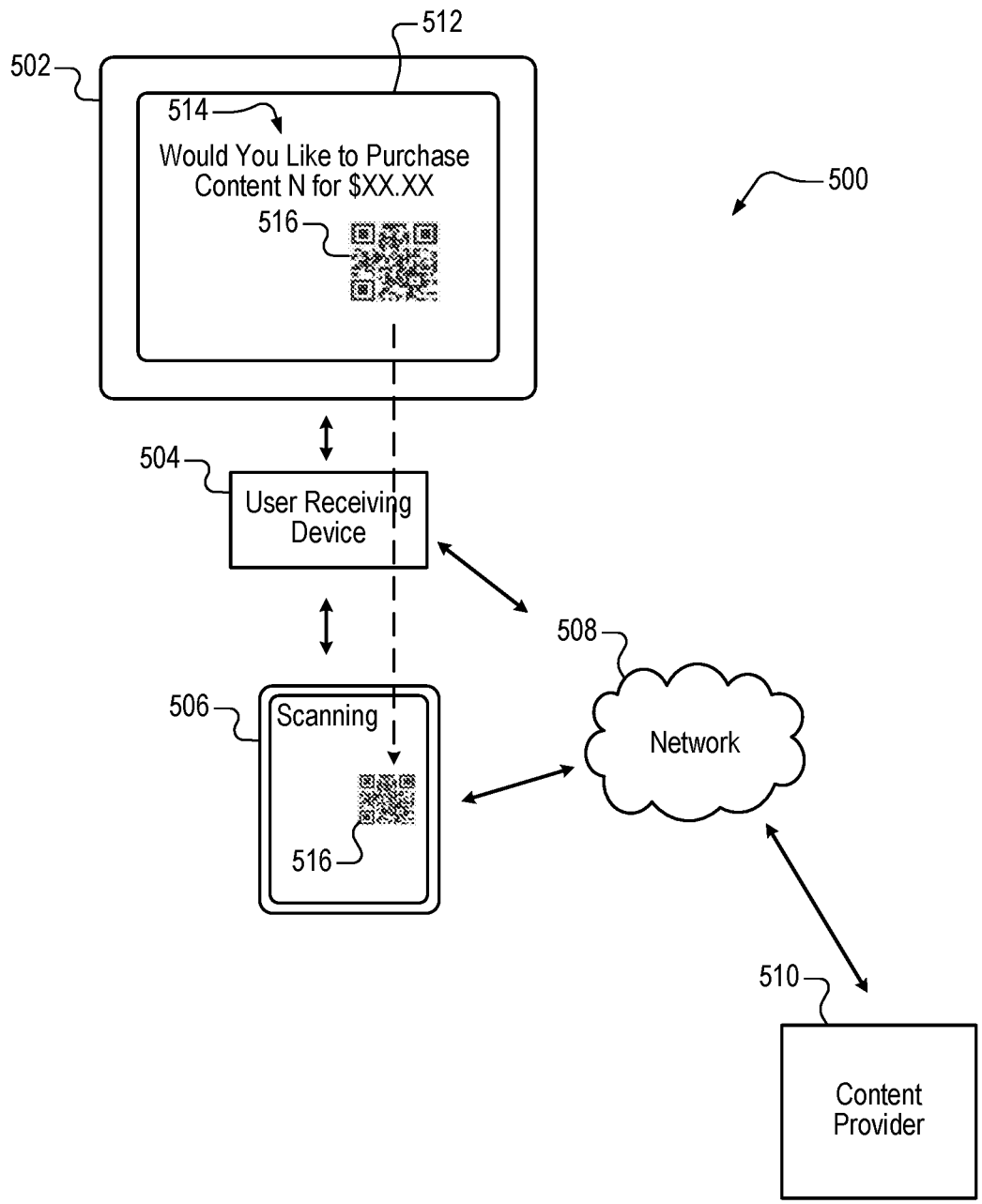

FIG. 6. is a functional block diagram of a content purchasing system illustrating purchase of content using a quick response code in accordance with the present disclosure.

Figure 7:
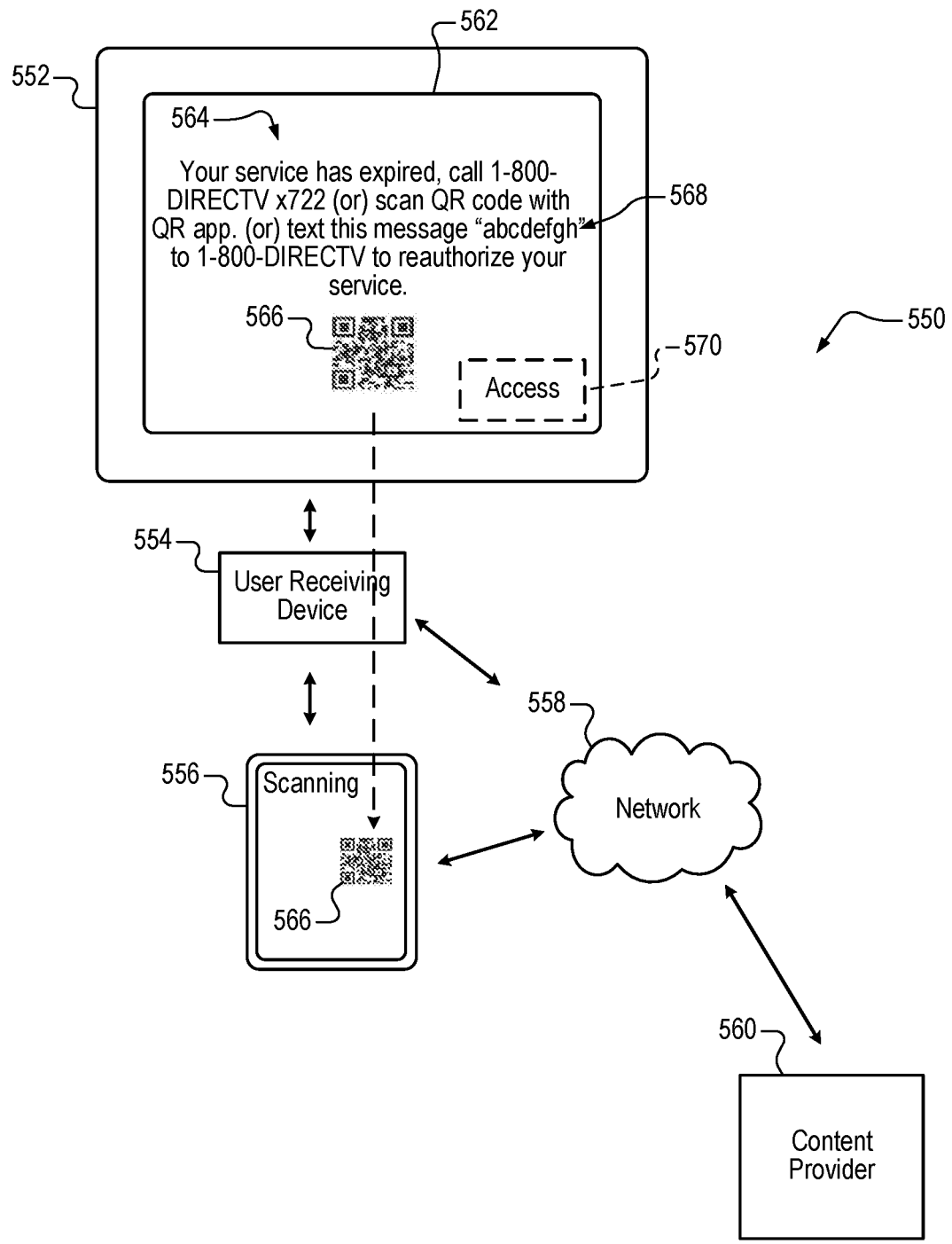

FIG. 7 is a functional block diagram of an authorization system illustrating reauthorization of content using a quick response code and/or a text message in accordance with the present disclosure.

Figure 8:
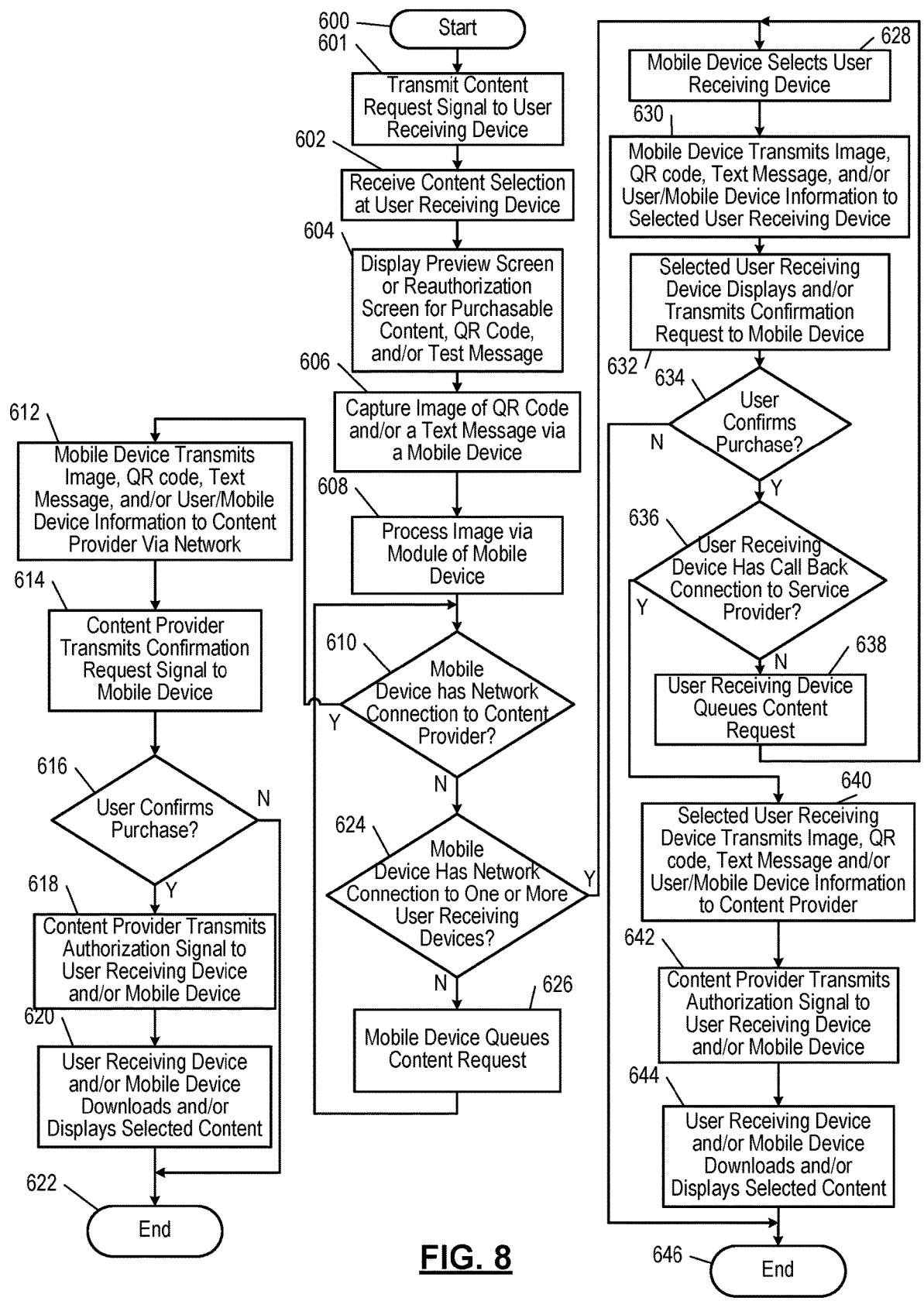

FIG. 8 illustrates a method of controlling purchasing and authorization to access content in accordance with the present disclosure.

DETAILED DESCRIPTION

Certain types of user receiving devices may not be connected to the Internet and/or may not be cable of calling back to and/or bi-directionally communicating with a service provider to request content (PPV content or other content). The user receiving devices may be referred to as "unconnected boxes". A user receiving device may not be able to perform a handshake procedure with a service provider in order to authorize reception of the content at the user receiving device. Thus, some customers of a service provider may not be able to receive certain content at user receiving devices of the customers. Examples are disclosed below that allow a customer to order content including PPV content, obtain authorization for content, and reauthorize reception and/or viewing of the content if authorization has not been obtained and/or is lost. These features are provided for customers with user receiving devices regardless of whether the user receiving devices are connected to an Internet and/or are capable of calling back to and/or bi-directionally communicating with a service provider.

Figure 1:
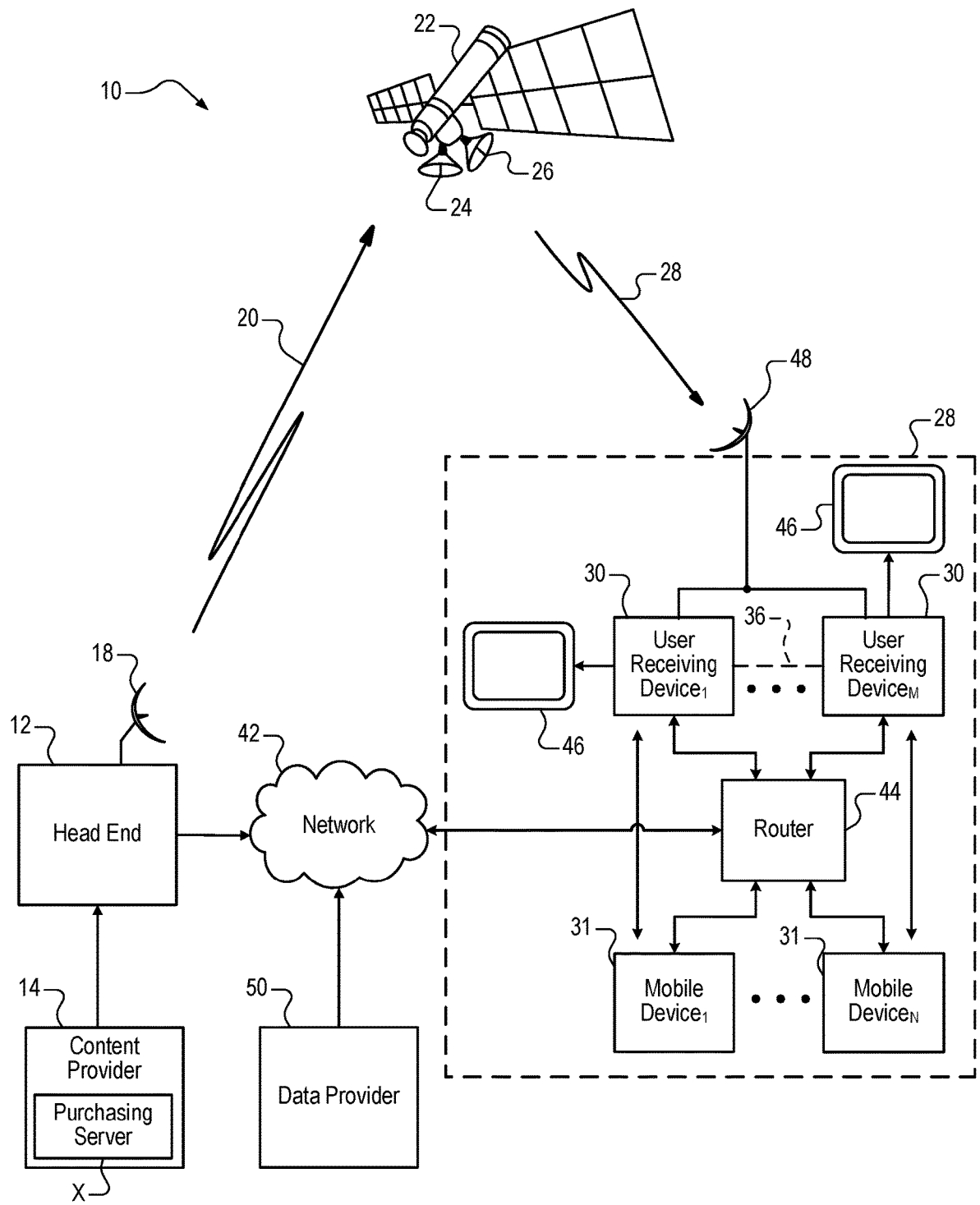
FIG. 1 is a functional block diagram of a communication system in accordance with the present disclosure.

FIG. 1 shows a communication system 10 that includes a head end 12. The head end 12 operates as a content processing system and a transmission source. The head end 12 may also be used for distributing content and providing billing data. The details of the head end 12 will be further described below with respect to FIG. 2.

One or more content providers 14, only one of which is illustrated, may provide content and data related to the content such as metadata to the head end 12. The content providers 14 may individually and/or collectively be referred to as a service provider. The content may include channels, programs, videos and/or other content. The metadata may include ratings data. Ratings data may include Motion Picture Association ratings such as G, PG, PG-13, R, NC-17 and X. Ratings data may also include television ratings such as TV-Y, TV-Y7, TV-G, TV-PG, TV-14, and TV-MA. Of course, different countries may have different rating systems. The head end 12 receives various types of content and data from the content provider 14 and communicates the content to various user devices associated with the system.

The head end 12 may communicate content to users in various manners including a satellite system and through terrestrial networks. Carrying through with the satellite example, the head end 12 includes an antenna 18 for communicating process content through an uplink 20 to a satellite 22. The satellite 22 may include a receiving antenna 24 and a transmitting antenna 26. The receiving antenna 24 receives the uplink signals 20 from the satellite antenna 18. The transmitting antenna 26 generates downlink signals 28 and communicates the downlink signals 28 to various user receiving devices 30 and/or mobile devices 31. The user receiving devices may be implemented as and/or include set top boxes. Although user receiving devices 30 are shown as being connected to a network 42 via a router 44 and being able to send signals back to the head end 12 and the content provider 14, the user receiving devices 30 may not be connected to the network 42 and/or an Internet and may not be able to send signals back to the head end 12 and/or the content provider 14.

The head end 12 may be connected to the user receiving devices 30 via the network 42 and/or the router 44. The network 42 may be a single network or a combination of different types of networks. For example, the network 42 may be a broadband wired network, a digital subscriber line (DSL) network, and/or a wireless network. A broadband wired network may be an Ethernet network or a phone line network. The network 42 may be a one-way network such that data may be communicated from the user receiving devices 30 to the head end 12. The network 42 may also be a two-way network that delivers content from the head end 12 in response to selection signals communicated from the user receiving devices 30. The network 42 may be in communication with the local area network 36. The network 42 may include an Internet.

The user receiving devices 30 may include and/or be connected to displays 46 (e.g., televisions), as shown. The displays 46 may display both video signals and output audio signals. The user receiving devices 30 may be referred to as fixed (or non-mobile) user devices because the user receiving devices are intended to be used from a fixed position on the surface of the earth. The user receiving devices 30 may include circuitry to tune, decode and store content therein. Details of the user receiving devices 30 are further described below.

The user receiving devices 30 may be in communication with each other through a network 36 such as a local area network. Content may be stored in one or more of the user receiving devices 30 and/or in a memory separate from the user receiving devices 30 and accessed by the user receiving devices 30. The content may be shared by and/or transmitted between the user receiving devices 30. The user receiving devices 30 may be located in respective rooms of a building (an example of which is designated 28), such as a home, multi-unit dwelling or business. The content may be delivered to two or more of the user receiving devices 30 during a same period of time in a multi-room viewing function. The user receiving devices 30 may be associated with one or more accounts.

The user receiving devices 30 are in communication with an antenna 48. The antenna 48 receives the downlink signals 28. Thus, the user receiving devices 30 may be referred to as satellite television receiving devices. However, the system has applicability in non-satellite applications, such as in wired or wireless terrestrial systems. The user receiving devices 30 may be included in and/or implemented as televisions, set top boxes, and/or set back boxes and thus may be referred to as fixed (or non-mobile devices). The user receiving devices 30 may be referred to as televisions, set top boxes, and/or set back boxes. The user receiving devices 30 may be interconnected.

The user receiving devices 30 may be connected to the router 44 and/or may be in communication with the network 42 and the mobile devices 31. The mobile devices 31 may be cellular phones, smart phones (i.e. have Internet access), dumb phones (i.e. do not have Internet access), tablets, laptops, wearable device, etc. A wearable device may be one of a number of types of devices that are worn by a user. A wearable device may be fixed wearable by a user meaning the wearable device is meant to be fixed to the user. Examples of wearable devices include a computerized watch such as a Samsung® or Apple® watch. The watch devices are fixed to an arm of the user. Another example of a wearable device is GOOGLE GLASS®, which is fixed to a head of a user. Of course, other types of wearable devices affixed to other parts of the body may be used. A wearable device may be in direct communication with the user receiving devices 30 through Bluetooth® connections. As described below, the user receiving devices 30 and the mobile devices 31 may include Bluetooth® transceivers (referred to as radios). The mobile devices 31 may also be in communication with the user receiving devices 30 via Internet protocol (IP) connections and/or the router 44. The mobile devices 31 may also be in communication with devices (e.g., the head end 12) outside the local area network via the router 44 and/or the network 42.

The router 44 may be a wireless router or a wired router or a combination of the two. For example, the user receiving devices 30 may be wired to the router 44 and wirelessly coupled to the mobile devices 31. The router 44 may communicate IP signals to the user receiving devices 30. The IP signals may be used for controlling various functions of the user receiving devices 30. IP signals may also originate from the user receiving devices 30 and be transmitted to the mobile device 31.

Figure 5:
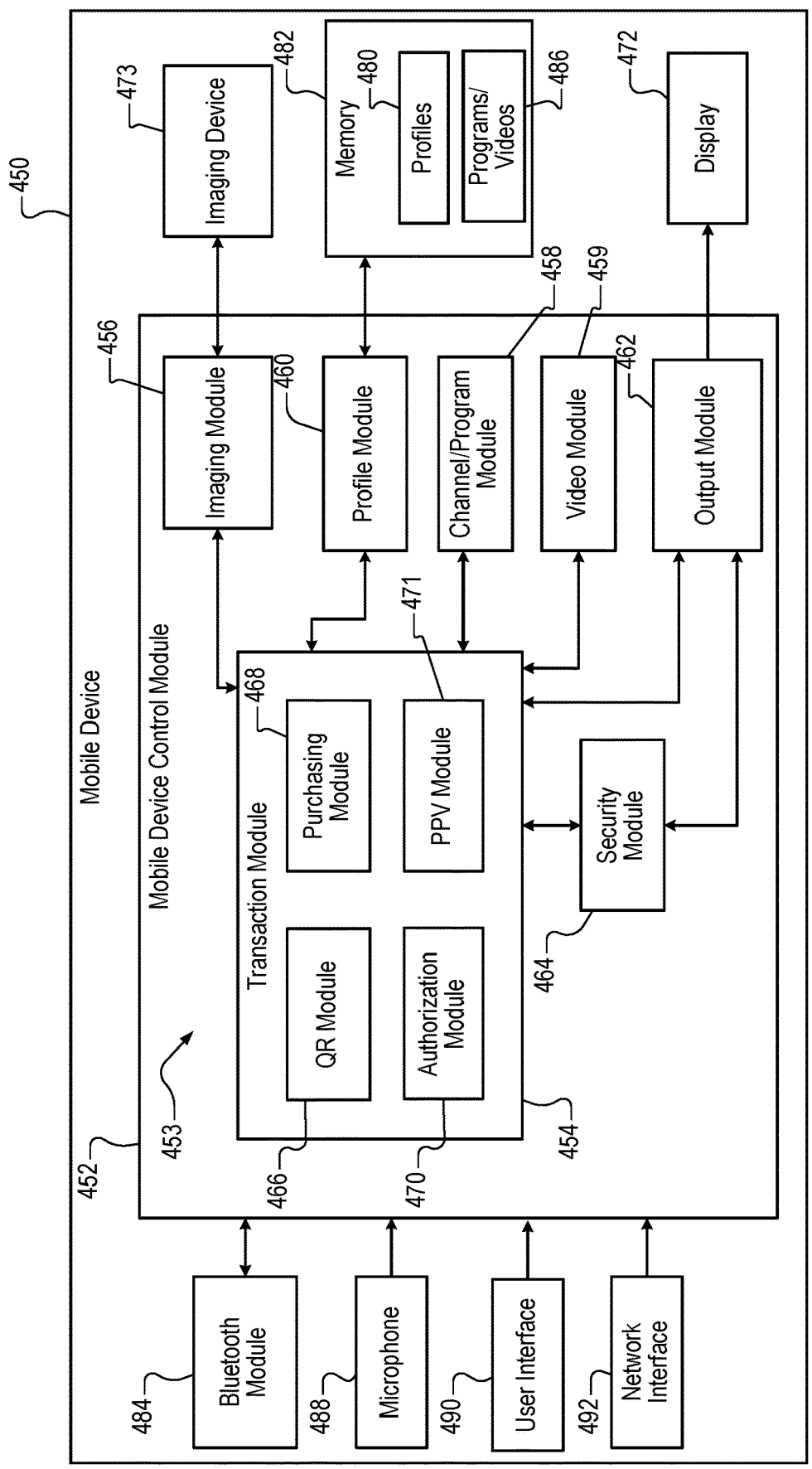
FIG. 5 is a functional block diagram of a mobile device in accordance with the present disclosure.

The mobile devices 31 may also have displays, an example of which is shown in FIG. 5. The displays of the mobile devices 31 may display video and output audio signals. The displays may be touch screens that act as user interfaces. Other types of user interfaces on the mobile devices 31 may include buttons and switches.

The network 42 may, for example, be a public switched telephone network, the Internet, a mobile telephone network or other type of network. The network 42 may be in direct wireless communication with the mobile device 31 via a cellular system and/or may be in indirect communication with the mobile devices 31 via the router 44 and/or the user receiving devices 30.

The content provider 14 provides content to the head end 12. Although only one content provider 14 is illustrated, more than one content provider may be incorporated in the system 10. The head end 12 distributes the content through the satellite 22 and/or the network 42 to the user receiving devices 30 and/or the mobile device 31.

A data provider 50 may also provide data to the head end 12. The data provider 50 may provide various types of data such as schedule data or metadata that is provided within the program guide system. The metadata may include various descriptions, actor, director, star ratings, titles, user ratings, television or motion picture parental guidance ratings, descriptions, related descriptions and various other types of data. The data provider 50 may provide the data directly to the head end and may also provide data to various devices such as the mobile device 31 and the user receiving device 30 through the network 42. This may be performed in a direct manner through the network 42.

Figure 2:
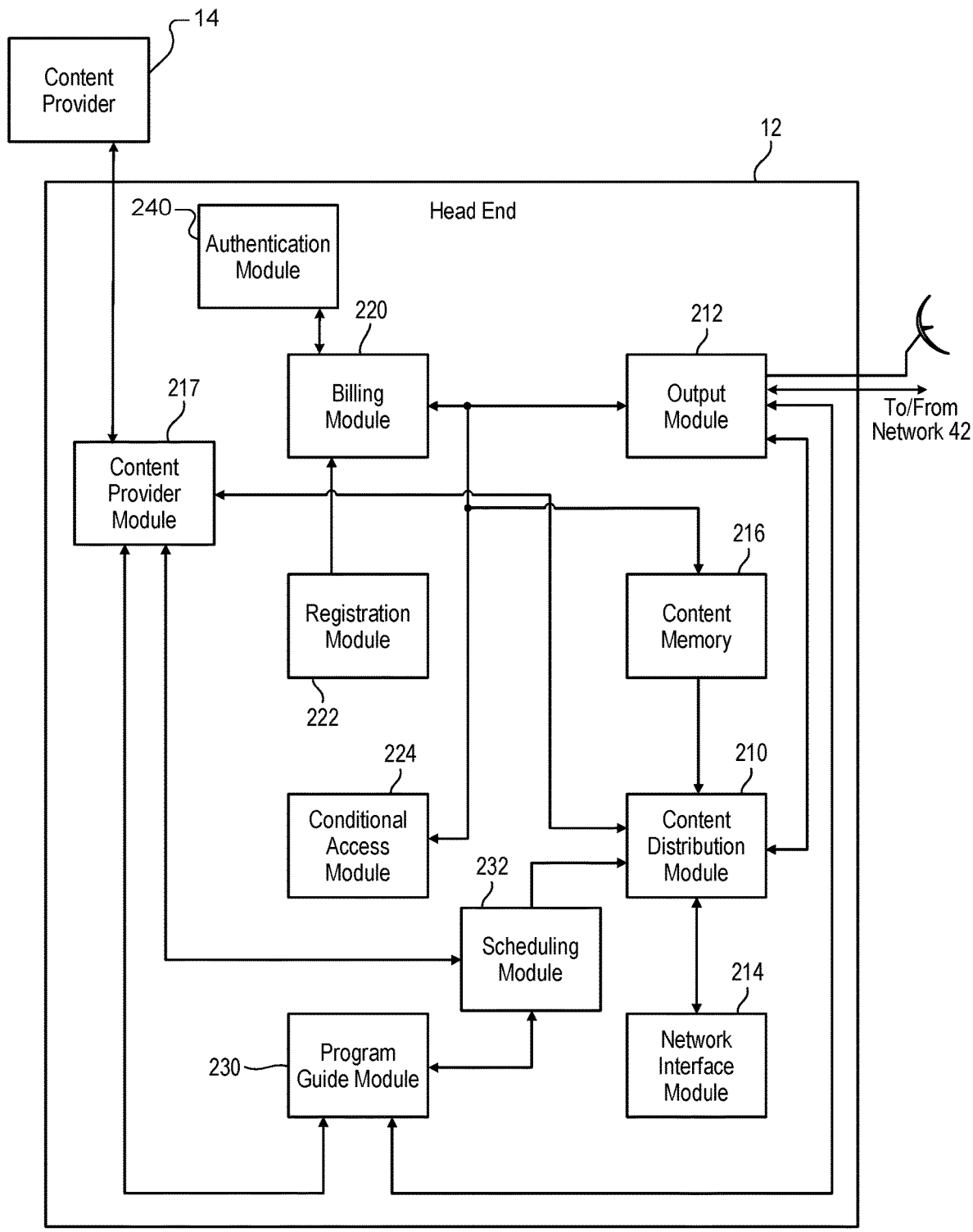
FIG. 2 is a functional block diagram of a head end in accordance with the present disclosure.

FIG. 2 shows the head end 12. It should be noted that the head end 12 is illustrated as a single device or facility, but may refer to multiple devices and/or facilities. That is, each of the individual components illustrated within the head end 12 may be physically located in various locations. The head end 12, one or more of the modules of the head end 12, and/or the memory of the head end 12 may be included in the content provider 14.

The head end 12 may include a content distribution module 210 that is used for distributing content through different means. The head end 12 may be in communication with an output module 212 for uplinking content to a satellite through the uplink antenna 18 as illustrated in FIG. 1 and/or transmitting signals to and/or receiving signals from the network 42. The output module may include and/or be implemented as an interface and/or a transceiver. The content distribution module 210 may thus format the signal in an appropriate format for uplinking through the output module 212. The output module 212 may uplink various content through the satellite to the user receiving devices 30 and/or the mobile devices 31 (collectively referred to as receiving devices) of FIG. 1. The content distribution module 210 may also transcode the content in formats suitable for use by the receiving devices.

The output module 212 may also communicate conditional access data to the receiving devices for accessing the content. The conditional access data may be communicated in a conditional access packet that includes data for tuning the receiving devices to receive the data. The conditional access data may be received directly or indirectly from a conditional access module 224. The conditional access module 224 may provide conditional access signals to a billing module 220 to allow a particular user access to content. The conditional access module 224 may generate a conditional access packet (CAP) together with data from the billing module 220 for uplinking through the output module 212. If the content is satellite content, access data such as, but not limited to, the particular transponder, channel and time at which the content is broadcasted may be provided in the CAP. If the content is to be provided over an Internet or other broadband-type network, an IP address of the content may be provided. The CAP may also include encryption/decryption information for the receiving devices to receive the content and decode the content.

The content distribution module 210 may also be in communication with a network interface module 214. The network interface module 214 may be in communication with the network 42 (shown in FIG. 1) for communicating content therethrough. The network interface module 214 (or the content distribution module 210) may format the content signals into internet protocol signals for distribution through the network 42.

The content distribution module 210 may also be in communication with content memory 216. The content memory 216 may be referred to as a content repository. The content memory 216 may receive content from a content providing module 217 for distribution through the satellite system or the network 42. The content providing module 217 may receive content from the content provider 14. The content memory 216 may save on-demand or pay-per-view content therein.

The content providing module 217 may also provide live television content for distribution through the content distribution module 210. The content distribution module 210 may thus communicate live content through the output module 212 or through the network interface module 214 to the appropriate networks.

The content providing module 217 processes received content for communication through the satellite 22 or network 42. The content providing module 217 may communicate live content as well as recorded content. The content memory 216 may store On-Demand or Pay-Per-View content for distribution at various times. The Pay-Per-View content may be broadcasted in a linear fashion (at a predetermined time according to a predetermined schedule). Linear content may be presently broadcasted and may also be scheduled to be broadcasted in the future. The content memory 216 may also store On-Demand content therein. On-Demand content is content that is broadcasted at the request of a user receiving device and may occur at any time (not on a predetermined schedule). On-Demand content is referred to as non-linear content.

A billing module 220 may also be incorporated into the head end 12. The billing module 220 may be used for associating one or more receiving devices with a user account. For example, different types of receiving devices such as mobile devices and one or more fixed set top boxes may be associated with a user account. By associating the receiving devices with a user account, content may be shared or accessed by each of the receiving devices associated with the account.

A registration module 222 may be used to associate each of the receiving devices with a user account at the billing module 220. The registration module 222 may be an automated system through which the user calls or accesses remotely by computer for associating the receiving devices with the account. The registration module 222 may also be partially human activated in which a customer service representative enters data for multiple receiving devices and associates the receiving devices with an account.

A program guide module 230 may also be included within the head end 12. The program guide module 230 receives metadata and other data from the content providing module 217. The program guide module 230 is ultimately used to communicate content and metadata to the output module 212. The program guide module may thus contain data related to the ratings of the particular content to be broadcasted and controlled by the content distribution module 210.

The program guide module 230 communicates program guide data to the user receiving devices 30 illustrated in FIG. 1. The program guide module 230 may create various objects with various types of data. The program guide module 230 may, for example, include schedule data, various types of descriptions for the content and content identifier that uniquely identifies each content item. The program guide module 230, in a typical system, communicates up to two weeks of advanced guide data for linear content to the user receiving devices. The guide data includes tuning data such as time of broadcast data, end time data, channel data, and transponder data name a few. Guide data may also include content available on-demand and pay-per-view content.

A scheduling module 232 may be in communication with the program guide module 230 and the content distribution module 210 to arrange the content to be distributed as well as provide program guide data for the content to be distributed. The scheduling module 232 may also be in communication with the content providing module 217 for obtaining a schedule for live channel broadcast.

An authentication module 240 may be used to authenticate various user receiving devices and mobile devices that communicate with the head end 12. The authentication module 240 may be in communication with a billing module 220. The billing module 220 may provide data for subscriptions and various authorizations suitable for the user receiving devices and the mobile devices. The authentication module 240 ultimately permits the user receiving devices and mobile devices to communicate with the head end 12. Authentication may be performed by providing a user identifier, a password, a user device identifier or combinations thereof. Channels and/or programs may be provided to the user receiving devices and/or mobile devices based on passcodes, as further described below.

Figure 3:
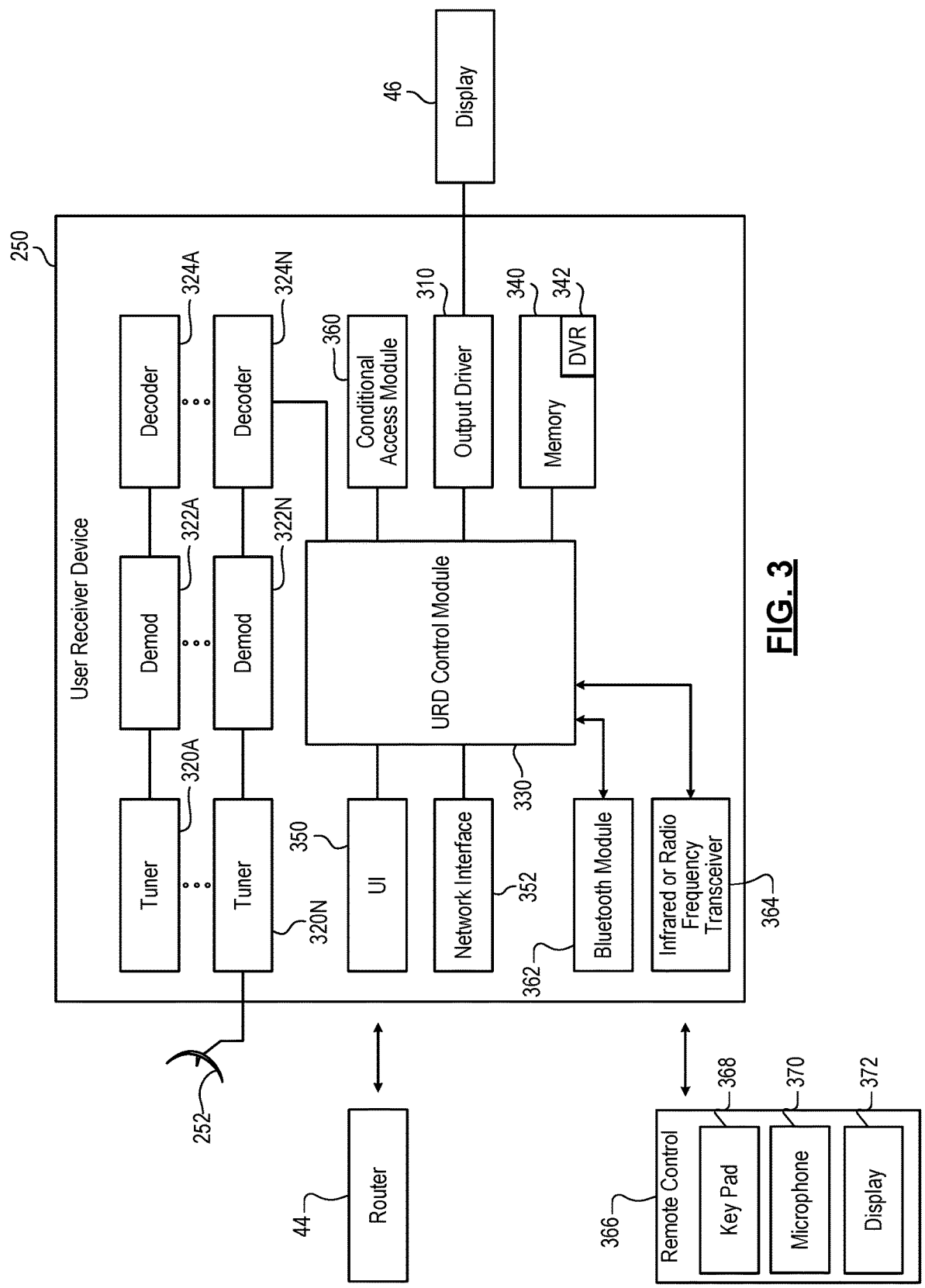
FIG. 3 is a functional block diagram of a user receiving device in accordance with the present disclosure.

FIG. 3 shows a user receiving device 250 that may replace any of the user receiving devices 30 of FIG. 1. Although, a particular example using the user receiving device 250 as a satellite set top box is illustrated, it is merely representative of various electronic devices with an internal control module (or controller) used as a content receiving device. An antenna 252 may be one of a number of different types of antennas used for receiving satellite signals that may include one or more low noise blocks associated therewith. The antenna 252 may be a single antenna used for satellite television reception. Of course, multiple antennas for receiving signals from satellites in different orbital slots may be used. In a terrestrial system such as a cable television system, no antenna may be used. Rather, a connector to a fiber optic or coaxial cable may be used. Terrestrial systems may have an antenna suitable for receiving terrestrial wireless signals. The user receiving device 250 is connected to a display (e.g., one of the displays 46). The user receiving device 250 may have an output driver 310 for formatting video and audio signals for output to the display 46.

A user receiving device control module 330 may be used to coordinate and control the various functions of the user receiving device 250. The user receiving device control module 330 may include and/or be implemented as a controller. These functions may include functions of: tuners 320A-320N (collectively 320); demodulators 322A-322N (collectively 322); decoders 324A-324N (collectively 324) such as forward error correction decoders; and any corresponding buffers and/or other related functions.

The tuners 320 receive respective signals or data from corresponding individual channels. The tuners 320 may receive data from a satellite or a source such as cable or over-the-air TV broadcasts. The tuners 320 may receive television programming content, program guide data or other types of data. The demodulators 322 demodulate the signals or data to form a demodulated signal or data. The decoders 324 decode the demodulated signals to form decoded data or decoded signals. By providing a number of tuners, demodulators and decoders, a number of different content programs may be used by the user receiving device 250. For example, live viewing and recording may be performed simultaneously. A number of recordings may be made simultaneously depending on the number of tuners available.

The user receiving device control module 330 is in communication with a memory 340. The memory 340 is illustrated as a single box. The memory 340 may be implemented as multiple different types of memories including a hard drive, a flash drive and various other types of memory devices. The memory 340 may be other types of memory or sections of different types of memory. The memory 340 may be non-volatile memory or volatile memory. The memory 340 may include a DVR 342. The DVR 342 may include recorded content stored for later playback.

The memory 340 may include storage for various operational data collected during operation of the user receiving device 250. For example, the memory 340 may store user configuration data for each user associated with a device or system. The user configuration data may include rating limits set by a user of the user receiving device 250. A default user configuration may also be established in case visual recognition is not achieved. This will be described in detail below. Other types of data in the memory 340 may include the channel subscription data, the blocked channels, adult channels, current set top box language, TV resolution data, to do list data, the conditional access module identifier, time zone data, time of day daylight savings, status data, aspect ratio data, viewing hours data, quick tune list and a zip code.

The memory 340 may also store the advanced program guide data. The memory 340 may store program guide data that is received from the head end. The program guide data may include amounts of data including two or more weeks of program guide data. The program guide data may be communicated to the user receiving device 250 in various manners including through the satellite 22 of FIG. 1. The program guide data may include content or program identifiers, ratings and various data objects corresponding thereto.

The user receiving device 250 may also include a user interface (UI) 350. The UI 350 may include various types of user interfaces such as a keyboard, push buttons, a touch screen, and a voice activated interface or the like. The UI 350 may be used to: select a channel; change user profiles including acceptable ratings; select various information such as content selections; change the volume; change the display appearance; and/or perform other functions. The UI 350 may also be used for selecting playback locations of the content.

A network interface 352 may be included within the user receiving device 250 to communicate various data through the networks 36, 42 described above. In one implementation, the user receiving device 250 does not include the network interface 352. The network interface 352 may be a WiFi, WiMax, WiMax mobile, wireless, cellular, or other types of communication systems. The network interface 352 may use various protocols for communication therethrough including, but not limited to, hypertext transfer protocol (HTTP).

The user receiving device 250 may also include a conditional access module 360. The conditional access module 360 prevents unauthorized reception of the television signals through the antenna 252. The conditional access module 360 may use a cryptographic hash to authorize the use and display of the received signals. The conditional access module 360 may receive the proper codes or signals from the head end.

The user receiving device control module 330 may also be connected to a Bluetooth module 362. The Bluetooth module 362 may include and/or be implemented as a Bluetooth transceiver. The Bluetooth transceiver may be in communication with mobile devices (e.g., the mobile devices 31 of FIG. 1). The user receiving device control module 330 may communicate with the mobile devices 31 via the router 44 and/or the Bluetooth transceiver.

The user receiving device control module 330 may also include an infrared or radio frequency transceiver 364 for communication with a remote control device 366. The remote control device 366 may be used to, for example, change a channel of the user receiving device 250. The remote control device 366 may also be used to, for example, resume viewing of a channel and/or a video, as is further described below. The remote control device 366 may include a keypad 368 for generating key signals that are communicated to the user receiving device 250. The remote control device 366 may also include a microphone 370 for receiving an audible signal and converting the audible signal to an electrical signal. The electrical signal may be communicated to the user receiving device 250. The remote control device 366 may also include a display 372.

Figure 4:
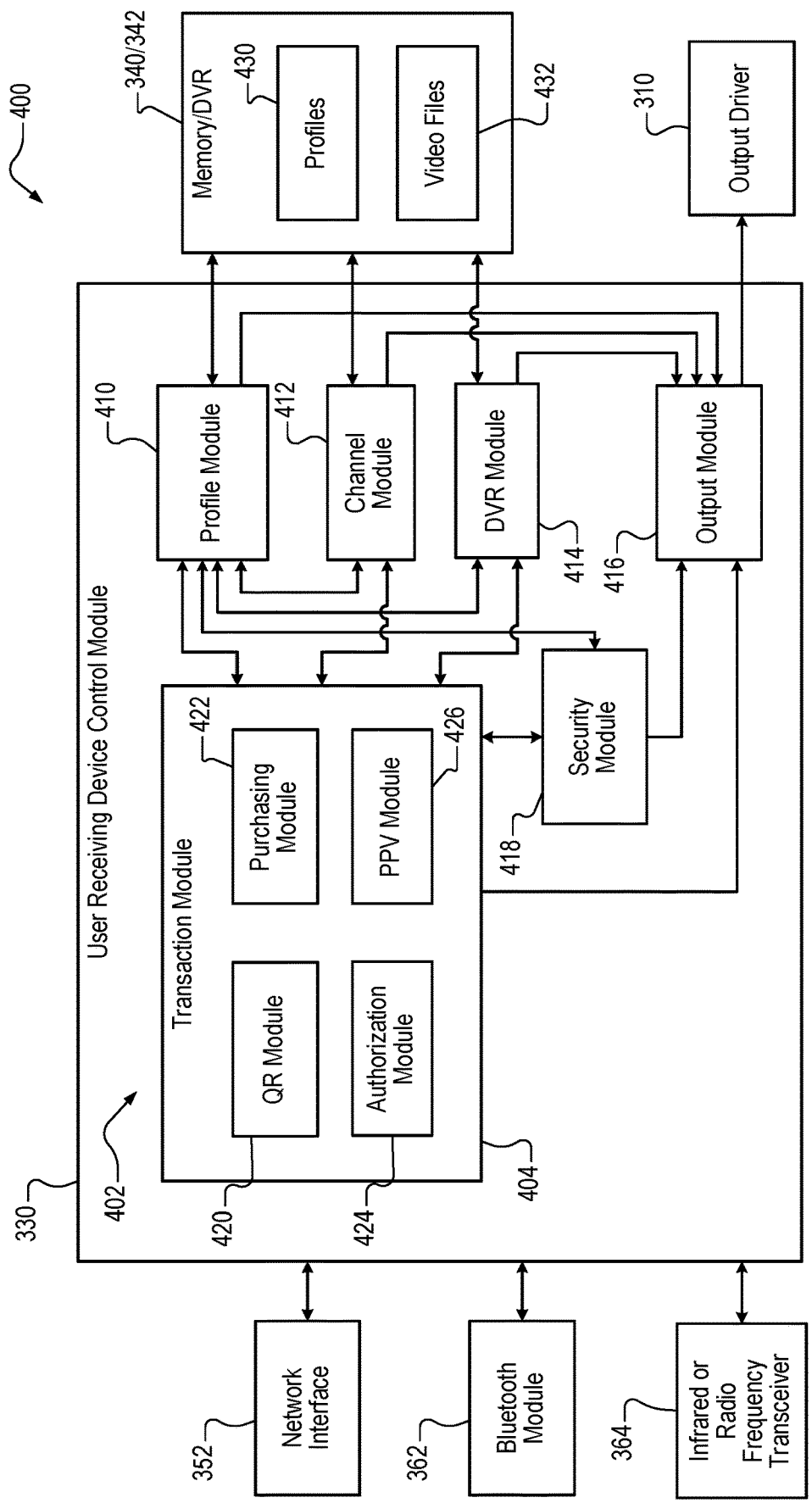
FIG. 4 is a functional block diagram of a control module of the user receiving device of FIG. 3.

FIG. 4 shows a portion 400 of a user receiving device (e.g., one of the user receiving devices 30, 250 disclosed above). The portion 400 includes the output driver 310, the user receiving device control module 330, the network interface 352, the Bluetooth module 362, and the transceiver 364. The portion 400 also includes the memory 340 and the DVR 342, which are shown collectively as memory/DVR 340/342. The user receiving device control module 330 includes a transaction system 402. The transaction system 402 includes a transaction module 404, a profile module 410, a channel module 412, a DVR module 414, an output module 416 and a security module 418.

The transaction module 404 includes a quick response (QR) module 420, a purchasing module 422, an authorization module 424, and a pay-per-view (PPV) module 426. The QR module 420 may generate QR codes or other types of codes (e.g., bar codes) for content to be purchased and/or content for which a user is requesting authorization (or reauthorization) to view. Each of the QR codes may include a two-dimensional matrix bar code. The QR code may be a machine-readable optical label containing information about the content, a user receiving device, a user and/or a mobile device. A QR code may contain information indicating a uniform resource identifier (URL). A mobile device may refer to a mobile phone, a tablet, a remote control device, a wearable device, etc.

The purchasing module 422 may control purchasing of content by a user of a mobile device. This may include receiving and/or exchanging identification information, billing information, and/or contact information with a mobile device of a user and/or a content provider. The stated information may be received from the mobile device and transferred to the content provider or may be provided by the content provider and incorporated into a QR code. The stated information may be shared with the QR module and be displayed to the user. The stated information may be stored in the memory 340 and accessed by any of the modules 420, 422, 424, 426. The purchasing module 422 may provide confirmation request messages, which may be displayed to confirm that the user wants to purchase certain selected content. The confirmation request messages may have originated at and/or have been received from the content provider. This is further described with respect to the method of FIG. 8.

The authorization module 424 may perform one or more handshake processes with the head end, the content provider, and/or a mobile device to authorize (or reauthorize) reception and/or display of content on a display of the corresponding user receiving device and/or the mobile device. The content may be PPV content or other content. In one embodiment, the authorization module 424 receives authorization signals from a content provider to permit downloading and/or displaying of certain content. This is described below with respect to the method of FIG. 8.

The authorization module 424 may generate reauthorization preview screens and/or reauthorization messages. The authorization module 424 may display via the output module 416 the reauthorization preview screens, the reauthorization messages and/or corresponding QR codes received from and/or generated by the QR module 420. The reauthorization preview screen may be a blank (or black) screen or may provide, for example, an image of a scene of the content attempting to be accessed by a user. The reauthorization preview screen may include a reauthorization message and/or a QR code. An example of a reauthorization preview screen is shown in FIG. 7.

The pay-per-view (PPV) module 426 may generate PPV preview screens and/or PPV messages. The PPV module 426 may display via the output module 416 the PPV preview screens, the PPV messages and/or corresponding QR codes received from and/or generated by the QR module 420. The PPV preview screen may be a blank (or black) screen or may provide, for example, an image of a scene of the content attempting to be accessed by a user. The PPV preview screen may include a PPV message and/or a QR code (or other code). An example of a PPV preview screen is shown in FIG. 6.

The profile module 410 manages profiles 430 of each of the mobile devices paired with the corresponding user receiving device. The profiles 430 may be stored in the memory 340 and accessed by the profile module 410. Each of the profiles 430 may have a unique identifier (ID) number, an assigned security level, and corresponding authorized channels, programs and/or videos. The security level may indicate which channels, programs, and/or videos are permitted to be displayed for the corresponding profile. Different profiles may have the same security level or different security levels. One or more mobile devices may be assigned to a profile and thus have a corresponding profile ID number. Each of the profiles may also include mobile device and/or profile specific features such as volume levels, maximum volumes, amount of time permitted ON over a predetermined period, a playlist of recorded videos, a preferred channel list, and other features. The profile module 410 may create each of the profiles 430 based on: parental control inputs; operation history of the corresponding mobile devices; time of day of watching a channel, program and/or video; and/or profile information provided by the corresponding mobile devices.

The channel module 412 may control selection and output of channels to the output driver 310 via the output module 416. The DVR module 414 may control selection, recording, and/or output of videos. The DVR module 414 may store videos in the DVR 342 and output the videos via the output module 416 to the output driver 310 for display. The channel module 412 and the DVR module 414 may operate based on parental guidance controls. The channel module 412 and the DVR module 414 may provide channels and/or videos to the output module based on the profile ID number and/or the security level associated with a profile of one or more mobile devices. The videos may be stored as video files 432 in the memory 340 and/or DVR 342.

The output module 416 controls output of channels, programs, and/or videos to the output driver 310. This may be based on parental guidance controls. The output module 416 may output channels and/or videos to the output driver 310 based on the profile ID number and/or the security level associated with a profile of one or more mobile devices.

The security module 418 may control operation of the output module 416 based on a security level of a profile. The security module 418 may also be used to set passcodes and/or require a passcode to view certain channels, programs and/or videos. The security module 418 may be in communication with the mobile devices via the Bluetooth module 362.

FIG. 5 shows a mobile device 450. Any of the mobile devices of FIG. 1 may be configured as the mobile device 450. The mobile device 450 includes a mobile device control module 452 that controls various functions of the mobile device 450. The mobile device control module 452 includes a second transaction system 453 that includes a transaction module 454, an imaging module 456, a channel module 458, a video module 459, a profile module 460, an output module 462 and a security module 464.

The transaction module 454 includes a second QR module 466, a second purchasing module 468, a second authorization module 470, and a second pay-per-view (PPV) module 471. The QR module 466 may receive QR codes (or other codes) and/or images of QR codes (or other codes) from the imaging module 456. The imaging module 456 is connected to an imaging device 473, such as a camera and may be used to acquire images of or optically scan QR codes (or other codes) displayed on, for example, a display (e.g., television) of a user receiving device (e.g., any user receiving device discloses herein). The imaging device 473 may include one or more charge-coupled devices (CCDs) and/or other image sensors. The images may be provided to the QR module and/or forwarded from the QR module to a head end, a content provider and/or a user receiving device. As an alternative, the QR module may decipher the QR code (or other code) and provide the information contained in the QR code (or other code) to the head end, content provider and/or user receiving device. The information embedded in the QR code (or provided based on the other code) may be included in a QR signal and/or a content request signal. Various types of information that may be included in a QR code (or determined based on the code scanned) are disclosed herein. Each of the QR codes may include a two-dimensional matrix bar code. The QR code may be a machine-readable optical label containing information about selected content, a user receiving device, a user and/or the mobile device. Although the examples disclosed herein are primarily described with respect to QR codes, other codes may be used in replacement of QR codes.

The purchasing module 468 may control purchasing of content by a user of a mobile device. This may include receiving and/or exchanging identification information, billing information, and/or contact information with a user receiving device and/or a content provider. The stated information may be included in one of the QR codes and/or transferred with the QR code to user receiving device and/or the content provider. The stated information may be shared with the QR module 466. The stated information may be stored in the memory 340 and accessed by any of the modules 466, 468, 470 and 471. The purchasing module 468 may provide confirmation request messages, which may be displayed on the mobile device to confirm that the user wants to purchase certain selected content. The confirmation messages may have originated at and/or have been received from the user receiving device and/or the content provider. This is further described with respect to the method of FIG. 8.

The authorization module 470 may perform a handshake process with the head end and/or the content provider disclosed above to authorize (or reauthorize) reception and/or display of content on a display of a user receiving device and/or the mobile device. An authorization signal for selected content may be received from a head end or content provider and forwarded from the mobile device to the user receiving device. The authorization signal permits downloading and/or displaying of certain content. This is described below with respect to the method of FIG. 8.

The PPV module 471 may control PPV purchase requests. The PPV module 471 may generate request signals for PPV content. The PPV request signals may include channel, program and/or video identification information. This information, if not already included in a QR code, may be provided along with the QR code to a head end, service provider and/or user receiving device. The PPV module 471 may receive PPV content from the head end, the content provider and/or the user receiving device and forward the content to the channel module, the video module, and/or the memory 482. The PPV module 471 may display the content via the output module 462 on the display 472.

The profile module 460 manages profiles of the mobile device 450 and/or other mobile devices. The profiles 480 may be stored in memory 482 and accessed by the profile module 460. The profiles 480 may have respectively a unique ID, an assigned security level, and corresponding authorized channels, programs and/or videos. The profile ID may be assigned by a user receiving device. The security level may be assigned by another mobile device (e.g., parental device) and/or a user receiving device. The security level may indicate which channels, programs and/or videos are permitted to be displayed for the corresponding profile. Each of the profiles may also include mobile device and/or profile specific features such as volume levels, maximum volumes, time permitted ON over a predetermined period, a playlist of recorded videos, a preferred channel list, and other features. The profile module 460 may create the profiles 480 based on parental control inputs, operation history of the corresponding mobile devices, and/or profile information provided by the corresponding mobile devices. As an alternative the profile module 460 may receive one or more of the profiles 480 from a user receiving device. A profile module 460 may store user profile data within the mobile device 450. The profile module 460 may store user settings, such as favorites and parental controls. The profile module 460 may also receive profile data from the head end 12.

The output module 462 controls output of signals, guides, channels, programs, and/or videos to the display 472. Although not shown, the mobile device control module 452 may include guide, channel, program, and/or video modules for the accessing and/or displaying respectively of guides, channels, programs, and/or videos. The output module 462 may output signals, guides, channels, programs, and/or videos to the display 472 based on the profile ID and/or the security level associated with the profile 480.

The security module 464 may control operation of the output module 462 based on a security level of the profile 480. The security module 464 may also be used to set passcodes and/or require a passcode to view certain channels, programs and/or videos. The security module 464 may be in communication with user receiving devices via a Bluetooth module 484 and/or other interface and/or transceiver. Although in FIGS. 4-5, Bluetooth modules 362 and 484 are shown, other wireless communication modules may be used having respective wireless communication protocols. For example, smart home wireless capable devices, such as ZigBee® modules operating according to ZigBee® protocols may be used instead of or in addition to the Bluetooth modules 362, 484.

In one implementation the mobile device 450 may be used as a remote control device and send signals to a user receiving device to select a channel, program and/or video. In another embodiment, the security module 464 provides a passcode, which may be entered by a user of the mobile device 450. Content received by the mobile device control module 452 may be stored in the memory. This may include programs and/or videos 486.

The mobile device control module 452 is in communication with a microphone 488 that receives audible signals and converts the audible signals into electrical signals. The audible signals may include a request signal. The request signal may be to perform a search and/or to obtain guide data, network data and/or playlist data. The mobile device control module 452 is also in communication with a user interface 490. The user interface 490 may include buttons, input switches and/or a touch screen.

The mobile device control module 452 is also in communication with a network interface 492. The network interface 492 may be used to interface with the network 42 of FIG. 1. As mentioned above, the network 42 may be a wireless network or the Internet. The network interface 492 may communicate with a cellular system or with the internet or both. A network identifier may be attached to or associated with each communication from the mobile device 450.

Various examples are disclosed below with respect to the embodiments of FIGS. 6-8 and other embodiments of the present disclosure. Although one or more of the embodiments are primarily described with respect to a content provider, all of the tasks performed by the content provider may be performed by a head end, a service provider, a network, and/or an intermediary device in communication with a corresponding mobile device, head end, and/or the content provider.

FIG. 6. shows a content purchasing system 500 that includes a display 502, a user receiving device 504, a mobile device 506, a network 508 (e.g., the network 42 of FIG. 1), and a content provider 510 (e.g., the content provider 14 of FIG. 1). The mobile device 506, based on a user input, may attempt to access PPV content (e.g., a channel, program and/or video) via the user receiving device 504. This may include, for example, the mobile device 506 transmitting a content request signal to the user receiving device 504. The content request signal may include a channel selection, a program selection and/or a video selection. The user receiving device 504, in response to the content request signal, may then display a content preview screen 512 including a content purchase message (or offer) 514, a QR code 516 and/or a text message. The content preview screen may be displayed when the user and/or the mobile device 506 is not authorized to view the selected PPV content. The QR code may include a unique ID for the mobile device 506 and/or for the user of the mobile device 506. The content preview screen 512 and the content purchase offer 514 may be respectively a PPV preview screen and a PPV message. The content purchase offer 514 may, for example, ask a user whether the user would like to purchase the PPV content for a certain price.

The mobile device 506 based on an input from a user may take a picture (i.e. capture an image) of the QR code, which may be transmitted to the content provider 510 via the network 508 and/or the user receiving device 504. This may be referred to as scanning the image. The QR code may be transmitted to the user receiving device and then forwarded to the content provider 510. In addition or as an alternative, the user may text (or send) the text message to the content provider 510 via the mobile device and/or a control module of the mobile device 506 may generate the text message based on an image of a text message displayed on the display 512. The mobile device 506 may perform image recognition to determine the text of the text message (or first text message) on the display 512 and generate a second text message to be sent to the content provider 510 via the network 508. The second text message may include the text in the first text message.

The content provider 510 upon receiving the QR code and/or the second text message may then respond to the mobile device 506 and/or the user receiving device 504 with an authorization code to access the PPV content. The user receiving device 504 and/or the mobile device 506 may then display the PPV content on the display 502 and/or a display of the mobile device 506.

FIG. 7 shows an authorization system 550 that includes a display 552, a user receiving device 554, a mobile device 556, a network 558 (e.g., the network 42 of FIG. 1), and a content provider 560 (e.g., the content provider 14 of FIG. 1). The mobile device 556, based on a user input, may attempt to access content via the user receiving device 554. The content may not be PPV content. This may include, for example, the mobile device 556 transmitting a content request signal to the user receiving device 554. The content request signal may include a channel selection, a program selection and/or a video selection. The user receiving device 554, in response to the content request signal, may then display a content preview screen 562 including a content purchase message (or offer) 564, a QR code 566 and/or a text message 568. The content preview screen may be displayed when the user and/or the mobile device 556 is not authorized to view the selected content. The user and/or the mobile device 556 may have been previously authorized to view the content, but the mobile device 556 has recently lost authorization (e.g., a valid authorization code) to access the content. Thus, the mobile device 556 may obtain reauthorization to display the content by transmitting the QR code and/or the text message to the content provider 560.

The QR code may include a unique ID for the mobile device 556 and/or for the user of the mobile device 556. The content preview screen 562 and the content purchase offer 564 may be respectively a PPV preview screen and a PPV message. The content purchase offer 564 may, for example, ask a user whether the user would like to purchase the content for a certain price.

The mobile device 556 based on an input from a user may take a picture (i.e. capture an image) of the QR code, which may be transmitted to the content provider 560 via the network 558 and/or the user receiving device 554. This may be referred to as scanning the image. The QR code may be transmitted to the user receiving device and then forwarded to the content provider 560. In addition or as an alternative, the user may text (or send) the text message to the content provider 560 via the mobile device and/or a control module of the mobile device 556 may generate the text message based on an image of a text message (or first text message) displayed on the display 562. The mobile device 556 may perform image recognition to determine the text of the first text message on the display 562 and generate a second text message to be sent to the content provider 560 via the network 558. The second text message may include the text in the first text message.

The content provider 510 upon receiving the QR code and/or the second text message may then respond to the mobile device 506 and/or the user receiving device 504 with an authorization code to access the content. The user receiving device 504 and/or the mobile device 506 may then display the content on the display 502 and/or a display of the mobile device 506.

For the embodiments of FIGS. 6-7 and other embodiments disclosed herein, the disclosed QR codes may include various information, such as user contact information, billing information, a user unique ID, a mobile device unique ID, a price for the selected content, a description and/or flyer of the selected content, a unique ID of the selected content, and/or other private data and/or metadata. The QR codes may include a short payment descriptor (SPAYD), which may include a description of the content, time that the content is to be displayed, a price of the content, and/or other private data and/or metadata. The QR codes may expire if not used within a predetermined period of time. The contact and billing information may include an address of the user, phone numbers of the user, credit card numbers, account numbers of the user, service provider account numbers of the user, etc. Any of this information may be embedded in a QR code and/or may be provided in a request signal along with the QR code to the content (or service) provider. The QR code may be sent to the content provider or the information in the QR code may be deciphered by the corresponding mobile device and transmitted in the request signal to the content provider. The request signal and the QR code may be transmitted to a content provider directly via the Internet, a broadband network, a wired network, a wireless network, and/or indirectly via a user receiving device. The user receiving device may transmit the request signal and/or the QR code to the content provider via the Internet, a broadband network, a wired network, a wireless network, and/or indirectly.

In one embodiment, a first portion of the stated information, a first portion of the request signal and/or a first portion of the information in the QR code is transmitted directly from the mobile device to the content provider. A second portion of the stated information, a second portion of the request signal and/or a second portion of the information in the QR code is transmitted from the mobile device to the user receiving device. The user receiving device then transmits second portion of the stated information, the second portion of the request signal and/or the second portion of the information in the QR code to the content provider. The service provider may then compared first and second portions of received information to confirm user and/or mobile device information and confirmation by the user of the requested (or selected) content.

Also, for the embodiments of FIGS. 6-7 and other embodiments disclosed herein, the text messages may be in the form of a unique code. The text messages may expire if not used within a predetermined period of time. The unique code may correspond to the content being requested, a unique ID of the user requesting the content, and/or a unique ID of the mobile device requesting the content. A content provider may store a translation table of text messages and corresponding unique IDs of users and mobile devices.

Although the QR codes and text messages may be visible to users other than the user requesting the content and the text messages may be user-visible alphanumeric and/or symbolic codes, since the user requesting the content has to enter log-in information (e.g., user ID, password, finger print scan, or other credentials) in order to obtain access to a content request screen on the mobile device, authorization by other users is prevented. The mobile device of the user requesting the content may transmit user information to a user receiving device, prior to the user receiving device displaying a QR code and/or a text message. This allows the user receiving device, a head end and/or a content provider to confirm user information prior to displaying the QR code and/or text message. The content provider is able to compare and determine whether information on the QR code and/or associated with the text message matches the user information received from the mobile device and/or the user receiving device and the corresponding information stored at the content provider. Also, as described below, confirmation request signals may be sent to the user to confirm and/or reenter user account information prior to the content being authorized and/or displayed.

In addition, for the embodiments of FIGS. 6-7 and other embodiments disclosed herein, the content preview message, PPV preview messages, authorization preview messages, reauthorization preview messages, the QR codes and/or text messages may be displayed anywhere on a screen, over a preview screen, and/or over a preview video being played out for the selected content. The QR codes and/or the text messages may also be included in a displayed guide (or menu). The guide may provide a list of available channels, programs and/or videos, corresponding times of the channels and/or programs, and corresponding QR codes and/or text messages. The QR codes and/or text messages are provided for the content not currently authorized for a user, a mobile device, and/or a user receiving device. As used herein, the term "user" may refer to an individual associated with an account provided by a content provider or other user.

For the embodiments of FIGS. 6-7 and other embodiments disclosed herein, the mobile devices may include software applications (referred to as "apps") with corresponding screens (or windows) to initiate capturing of a QR code and/or text message. The apps may be controlled via one or more modules (e.g., control modules) of the mobile devices and may allow a user to send various information disclosed herein to a user receiving device and/or a content provider. The apps and corresponding screens may allow the user to perform various tasks such as confirming a purchase, send billing information, send contact information, etc.

In another example embodiment, in addition to or as an alternative to using a QR code and/or a text message to obtain access to selected content, an access button (or other user input element) may be displayed on a display connected to a user receiving device and/or on a display of a user device. The user may click on the access button and obtain access to the content. An example access button 570 is shown in FIG. 7. The access button may allow quick access to the content without taking a picture and/or transmitting a QR code, a text message, and/or information associated with a QR code and/or text message to a user receiving device and/or content provider. A user of a mobile device may be requested to enter log-in information (e.g., user ID, password, finger print scan, or other credentials) in order to obtain access to the screen having the access button, which prevents unauthorized access by other users. The mobile device of the user requesting the content may transmit user information to a user receiving device, prior to the user receiving device displaying the access button. This allows the user receiving device, a head end and/or a content provider to confirm user information prior to displaying the access button. Upon the user clicking on the access button, the mobile device may transmit a content request signal to the user receiving device and/or the content provider. The content request signal may include content information, user information, mobile device information, and/or other related information, as described herein. Also, as described below, confirmation request signals may be sent to the user to confirm and/or reenter user account information prior to the content being authorized and/or displayed.

The systems disclosed herein may be operated using numerous methods, an example method is illustrated in FIG. 8. Although the following tasks of FIG. 8 are primarily described with respect to the implementations of FIGS. 1-7, the tasks may be easily modified to apply to other implementations of the present disclosure. The tasks may be iteratively performed. In FIG. 8, a method of controlling purchasing and/or authorization to content is shown. Although the tasks of FIG. 8 are described with respect to certain modules and/or devices, the tasks of FIG. 8 may be performed by control modules and/or other modules of a mobile device, a user receiving device, a content provider, a head end, a service provider and/or other device. The mobile device, user receiving device and content provider described below with respect to the tasks of FIG. 8 may refer to any mobile device, user receiving device and/or content provider disclosed herein.

The method may begin at 600. At 601, the mobile device transmits a content request signal to the user receiving device requesting access to content, such as a channel, program and/or video. The content may be PPV content and/or other content. At 602, the user receiving device receives the content request signal from the mobile device. The content request signal includes a unique ID of content selected by the user of the mobile device.

At 604, the user receiving device determines that the selected content has not been purchased by the user and/or that the user does not have authorized access to the selected content and displays a content preview screen. The content preview screen may be a PPV preview screen, an authorization screen, and/or a reauthorization screen. The content preview screen may include a PPV message, an authorization message, a reauthorization message, a QR code or other code (e.g., bar code), and/or a text message. Although QR codes are referred to below other codes may be used.

At 606, an imaging device of the mobile device may capture an image of the QR code and/or a text message. At 608, the image may be received, processed and/or forwarded via one or more modules of the mobile device, such as a QR module, a control module, a purchasing module, a PPV module and/or an authorization module. The one or more modules may decipher the QR code and/or perform image recognition to determine the text message. In one embodiment, the one or more modules forwards the QR code and/or the text message alone or along with a request message to a user receiving device and/or a content provider, as described in tasks 612, 630, 640.

At 610, the mobile device may determine whether the mobile device has a network connection to a content provider. This may be, for example an Internet connection, a broadband connection, or other network connection. If the mobile device has a network connection to the content provider, task 612 may be performed, otherwise task 624 may be performed. Although task 610 is shown as being performed prior to task 624, task 610 may be performed subsequent to task 624 and/or while task 624 is being performed. In other words tasks 612-620 and/or tasks 628-644 may be performed. Tasks 628-644 may be performed while tasks 612-620 are performed.

At 612, the mobile device transmits the image, the QR code, the text message, information embedded in and/or corresponding to the QR code and/or the text message, user information, mobile device information and/or content information to the content provider (or head end) via the network. At 614, the content provider receives the information transmitted at 612 and may transmit a confirmation request signal to the mobile device to confirm the purchase and/or content request. As an alternative, the user receiving device may have displayed and/or transmitted a confirmation request, prior to the information transmitted at 612 being transmitted to the content provider.

At 616, the content provider determines whether the user via the mobile device has confirmed the purchase. This may include the mobile device transmitting a confirmation response signal to the content provider (or the user receiving device). The user may click on a confirm button on the mobile device and/or displayed on a display connected to the user receiving device. If confirmed, task 618 is performed, otherwise the method may end at 622.

At 618, the content provider transmits an authorization signal to the user receiving device and/or the mobile device for the selected content. The authorization signal may include an authorization code for the selected content. At 620, based on the authorization code, the user receiving device and/or the mobile device may download and/or display the selected content. In one embodiment, the content is downloaded and stored in memory of the user receiving device and/or the mobile device. The user may not be billed for the content until the content is displayed via the user receiving device and/or the mobile device. The method may end at 622 subsequent to performing task 620.

At 624, the mobile device may determine whether the mobile device is connected to one or more user receiving devices. If the mobile device is connected to one or more user receiving devices, task 628 is performed, otherwise task 626 is performed. At 626, the mobile device may queue (e.g., store in memory) the content request including any of the above-stated information including the QR code, the text message, the user information, the mobile information, the content information, and/or other related information. The mobile device may perform task 612 and/or task 628 when a connection is established between the mobile device and a network connected to the content provider and/or between the mobile device and one or more user receiving devices. The mobile device may wait until a connection is established and then proceed. If a connection is not established for a predetermined period of time, then the mobile device may drop the content request, which may include deleting the content request from memory.

At 628, the mobile device may select a user receiving device. At 630, the mobile device transmits the image, the QR code, the text message, the information embedded in and/or corresponding to the QR code and/or the text message, the user information, the mobile device information and/or the content information to the selected user receiving device. At 632, the selected user receiving device may display on the display connected to the user receiving device and/or transmit a confirmation request to the mobile device.

At 634, the selected user receiving device determines whether the user via the mobile device has confirmed the purchase. This may include the mobile device transmitting a confirmation response signal to the user receiving device. The user may click on a confirm button on the mobile device and/or displayed on a display connected to the user receiving device. If confirmed, task 636 is performed, otherwise the method may end at 646.

At 636, if the selected user receiving device has a call back connection (or network connection) to the content provider, then task 640 is performed, otherwise task 638 is performed. At 638, the selected user receiving device may queue the content request including any of the above-stated information including the QR code, the text message, the user information, the mobile information, the content information, and/or other related information. The selected user receiving device may perform task 640 when a connection is established between the user receiving device and a network connected to the content provider and the user receiving device is able to transmit signals to the content provider via the network connection. The selected user receiving device may wait until a connection is established and then proceed. If a connection is not established for a predetermined period of time, then the selected user receiving device may drop the content request, which may include deleting the content request from memory.

At 640, the selected user receiving device transmits some or all of the above-stated information including the QR code, the text message, the user information, the mobile information, the content information, and/or other related information to the content provider. At 642, the content provider transmits an authorization signal with an authorization code to the selected user receiving device and/or the mobile device. Although not shown, a confirmation request may be transmitted from the content provider to the selected user receiving device and/or the mobile device to confirm the content request prior to sending the authorization signal.

At 644, based on the authorization code, the user receiving device and/or the mobile device may download and/or display the selected content. In one embodiment, the content is downloaded and stored in memory of the user receiving device and/or the mobile device. The user may not be billed for the content until the content is displayed via the user receiving device and/or the mobile device. The method may end at 646 subsequent to performing task 644.

The above-described tasks of FIG. 8 are meant to be illustrative examples; the tasks may be performed sequentially, synchronously, simultaneously, continuously, during overlapping time periods or in a different order depending upon the application. Also, any of the tasks may not be performed or skipped depending on the implementation and/or sequence of events.

The above-described methods allow a user to easily and quickly access content regardless of whether an available user receiving device is connected via an Internet, DSL or broadband network to a content provider and/or is capable of calling back and/or transmitting signals to a content provider. The methods allow a user to easily access content without having to make a phone call to a content provider or call center. Users (or customers) are able to have their lack of access to content issue quickly resolved without having to wait on hold to speak to a service provider operator.

The above-disclosed content providers, head ends, and service providers may include and/or be implemented as respective servers. The servers may include respective control modules for performing one or more of the corresponding tasks and/or functions disclosed herein.

The wireless communications described in the present disclosure with respect to Bluetooth transceivers of user receiving devices and mobile devices may include transmission of data and/or signals having short-wavelength ultra-high frequency (UHF) radio waves in an industrial, scientific and medical (ISM) radio frequency band from 2.4 to 2.485 GHz. The signals may be transmitted based on Bluetooth protocols and/or standards. The signals may be transmitted based on Bluetooth low energy (or smart) protocols and/or standards. The Bluetooth transceivers may include respective antennas.

The wireless communications described in the present disclosure can be conducted in full or partial compliance with IEEE standard 802.11-2012, IEEE standard 802.16-2009, IEEE standard 802.20-2008, and/or Bluetooth Core Specification v4.0. In various implementations, Bluetooth Core Specification v4.0 may be modified by one or more of Bluetooth Core Specification Addendums 2, 3, or 4. In various implementations, IEEE 802.11-2012 may be supplemented by draft IEEE standard 802.11ac, draft IEEE standard 802.11ad, and/or draft IEEE standard 802.11ah.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A OR B OR C), using a non-exclusive logical OR, and should not be construed to mean "at least one of A, at least one of B, and at least one of C." It should be understood that one or more steps within a method may be executed in different order (or concurrently) without altering the principles of the present disclosure.

In this application, including the definitions below, the term 'module' or the term 'controller' may be replaced with the term 'circuit.' The term 'module' may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

The teachings of the present disclosure can be implemented in a system for communicating content to an end user or user device. Both the data source and the user device may be formed using a general computing device having a memory or other data storage for incoming and outgoing data. The memory may comprise but is not limited to a hard drive, FLASH, RAM, PROM, EEPROM, ROM phase-change memory or other discrete memory components.

A content or service provider is also described herein. A content or service provider is a provider of data to the end user. The service provider, for example, may provide data corresponding to the content such as metadata as well as the actual content in a data stream or signal. The content or service provider may include a general purpose computing device, communication components, network interfaces and other associated circuitry to allow communication with various other devices in the system.

Further, while the disclosure is made with respect to the delivery of video (e.g., television (TV), movies, music videos, etc.), it should be understood that the systems and methods disclosed herein could also be used for delivery of any media content type, for example, audio, music, data files, web pages, advertising, etc. Additionally, throughout this disclosure the transfer of video, programs, or channel information may include and is not limited to the transfer of data, content, information, programs, movie trailers, movies, advertising, assets, video data, etc.

As used herein, the term "title" will be used to refer to, for example, a movie itself and not the name of the movie. While the following disclosure is made with respect to example DIRECTV® broadcast services and systems, it should be understood that many other delivery systems are readily applicable to disclosed systems and methods. Such systems include wireless terrestrial distribution systems, wired or cable distribution systems, cable television distribution systems, Ultra High Frequency (UHF)/Very High Frequency (VHF) radio frequency systems or other terrestrial broadcast systems (e.g., Multi-channel Multi-point Distribution System (MMDS), Local Multi-point Distribution System (LMDS), etc.), Internet-based distribution systems, cellular distribution systems, power-line broadcast systems, any point-to-point and/or multicast Internet Protocol (IP) delivery network, and fiber optic networks. Further, the different functions collectively allocated among a service provider and integrated receiver/decoders (IRDs) as described below can be reallocated as desired without departing from the intended scope of the present patent.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A user receiving device comprising:
an interface configured to receive a content request signal from a mobile device to access content and to receive user information from the mobile device; and
a control module configured to, in response to the content request signal, confirm the user information and display a content preview screen on a display, wherein the content preview screen includes a message, and, when the user information is confirmed, the content preview screen includes at least one of a quick response code, a bar code, a text message and a user input element,
wherein the interface is configured to, based on the at least one of the quick response code, the bar code, the text message and a user input corresponding to the user input element, receive a second request signal to access the content from the mobile device; and
wherein the control module is configured to obtain an authorization code based on the second request signal and download or display the content based on the authorization code.

2. The user receiving device of claim 1, wherein:
the content preview screen includes the quick response code;
the interface is configured to receive from the mobile device the quick response code or information corresponding to the quick response code; and
the control module is configured to obtain the authorization code based on the quick response code or the information corresponding to the quick response code.

3. The user receiving device of claim 1, wherein:
the content preview screen includes the text message;
the interface is configured to receive from the mobile device the text message or information corresponding to the text message; and
the control module is configured to obtain the authorization code based on the text message or information corresponding to the text message.

4. The user receiving device of claim 1, wherein:
the content preview screen includes the user input element; and
the interface is configured to receive from the mobile device the second request signal corresponding to the user input element.

5. The user receiving device as recited in claim 1 wherein the content request signal comprises at least one of a channel selection, a program selection and a video selection.

6. The user receiving device as recited in claim 1 wherein the control module displays the content preview screen when the user and/or the mobile device is unauthorized.

7. The user receiving device as recited in claim 1 wherein the mobile device lost authorization and the authorization code is a reauthorization code.

8. The user receiving device as recited in claim 1 wherein the interface displays the text message and is configured to, based on an image of a text message or a user input corresponding to the user input element, receive the second request signal to access the content from the mobile device.

9. The user receiving device as recited in claim 1 wherein interface display the quick response code and the quick response code comprises a first unique identifier for the mobile device and a user of the mobile device.

10. The user receiving device as recited in claim 1 wherein the message comprises a purchase price.

11. A method of operating a user receiving device, the method comprising:
receiving at the user receiving device a content request signal from a mobile device to access content;
receiving user information at the user device from the mobile device;
confirming the user information;
in response to the content request signal, displaying a content preview screen on a display, wherein the content preview screen includes a message and, when the user information is confirmed, the content preview screen includes at least one of a quick response code, a bar code, a text message and a user input element;
based on the at least one of the quick response code, the bar code, the text message and a user input corresponding to the user input element, receiving a second request signal to access the content from the mobile device; and
obtaining an authorization code based on the second request signal and download or display the content based on the authorization code.

12. The method of claim 11, comprising:
receiving at the user receiving device the quick response code or information corresponding to the quick response code from the mobile device, wherein the content preview screen includes the quick response code; and
obtaining the authorization code based on the quick response code or the information corresponding to the quick response code.

13. The method of claim 11, comprising:
receiving at the user receiving device the text message or information corresponding to the text message from the mobile device, wherein the content preview screen includes the text message; and
obtaining the authorization code based on the text message or information corresponding to the text message.

14. The method of claim 11, comprising receiving at the user receiving device the second request signal corresponding to the user input element from the mobile device, wherein the content preview screen includes the user input element.

15. The method of claim 11, wherein the content request signal comprises at least one of a channel selection, a program selection and a video selection.

16. The method of claim 11, further comprising displaying the content preview screen when the user and/or the mobile device is unauthorized.

17. The method of claim 11, wherein the mobile device lost authorization and the authorization code is a reauthorization code.

18. The method of claim 11, further comprising displaying the text message in the interface and receiving the second request signal to access the content from the mobile device through an interface based on an image of a text message or a user input corresponding to the user input element.

19. The method of claim 11, further comprising displaying the quick response code on the interface and wherein the quick response code comprises a first unique identifier for the mobile device and a user of the mobile device.

20. The method of claim 11, wherein the message comprises a purchase price.

* * * * *